C. D. RATTRAY & A. ROBERTSON.
HORSESHOE.
No. 178,955. Patented June 20, 1876.
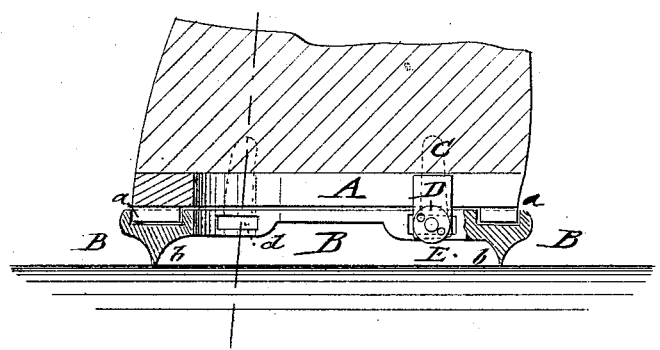
Fig: 1.
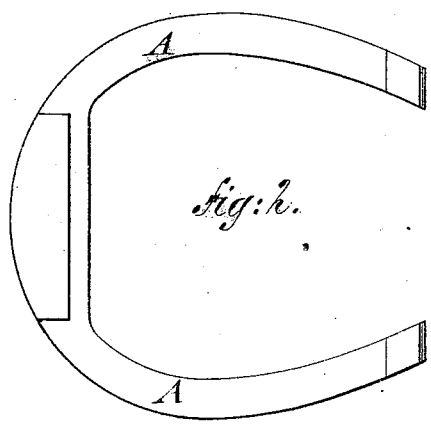
Fig: 2.
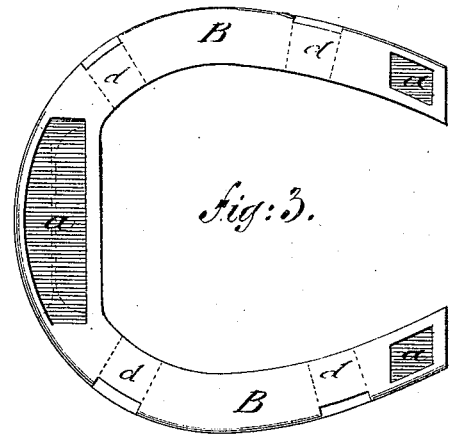
Fig: 3.
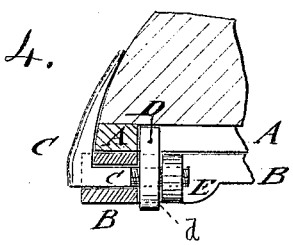
Fig: 4.
WITNESSES:
Geo. Nida
John Goethals
INVENTOR:
C. D. Rattray
A. Robertson
BY
ATTORNEYS.

UNITED STATES PATENT OFFICE.

CHARLES D. RATTRAY AND ALEXANDER ROBERTSON, OF NEW YORK, N. Y.

IMPROVEMENT IN HORSESHOES.

Specification forming part of Letters Patent No. 178,955, dated June 20, 1876; application filed May 22, 1876.

*To all whom it may concern:*

Be it known that we, CHARLES D. RATTRAY and ALEXANDER ROBERTSON, of the city, county, and State of New York, have invented a new and Improved Horseshoe Attachment, of which the following is a specification:

In the accompanying drawing, Figure 1 represents a vertical longitudinal section of a hoof with shoe and attachment; Fig. 2, a detail bottom view of the shoe; Fig. 3, a detail top view of the attachment to the same; and Fig. 4, a detail vertical transverse section of the shoe and attachment on line *x x*, Fig. 1, showing mode of securing it to shoe and hoof.

Similar letters of reference indicate corresponding parts.

Our invention relates to an improved ice-shoe attachment for horses, which may be readily and firmly applied over the common shoe and to the hoof, so as to be used whenever required, and taken off without difficulty.

The invention consists of an ice-shoe with sharp calks that is fitted over the common shoe, and attached to the hoof and shoe by curved outer pieces passing through the attachment, and by interior binding-pieces and screw-nuts screwing on the inner threaded ends of the curved binding-pieces.

In the drawing, A represents a common horseshoe, and B an ice-shoe or attachment that corresponds in shape thereto, and has recesses *a* fitting the calks of the shoe. The ice-shoe B is provided with sharp calks *b*, to prevent the slipping of the horses on the frozen or snow-covered streets, and also with horizontal slots or recesses *d* at opposite points, through which the lower horizontal parts of the binding-strips C pass, which bear, by their outer curved and upward-extending sections on the hoof and shoe, so as to exert—in connection with interior binding-pieces D, which ride the bolt between the nut and ice-shoe, and bear against the inner side of the upper shoe and screw-nuts E—a rigid binding action thereon. The screw-nuts E are tightly screwed on the threaded interior parts of the binding-pieces C, and secure by the pressure of the outer curved pieces C and the inner binding-pieces D the intimate and strong connection of the ice-shoe with the hoof and shoe without detriment or inconvenience to the horse.

The attachment is readily taken off when the danger of slipping is over, being applied as required, as the ice-shoe may be readily put on by any one without difficulty.

Having thus described our invention, we claim as new and desire to secure by Letters Patent—

As an improved attachment or ice-shoe for horses, the combination, with the shoe A, of a detachable ice-shoe, B, fitting over the calks of the former, and being attached by curved outer hoof and shoe-binding pieces C, inner retaining-pieces D, and fastening screw-nuts E, substantially in the manner set forth.

CHARLES D. RATTRAY.
   ALEXANDER ROBERTSON.

Witnesses:
 T. B. MOSHER,
 ALEX. F. ROBERTS.